US009612458B1

(12) United States Patent
Lentine et al.

(10) Patent No.: US 9,612,458 B1
(45) Date of Patent: Apr. 4, 2017

(54) RESONANT OPTICAL DEVICE WITH A MICROHEATER

(71) Applicant: Sandia Corporation, Albuquerque, NM (US)

(72) Inventors: Anthony L. Lentine, Albuquerque, NM (US); Christopher DeRose, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 148 days.

(21) Appl. No.: 14/260,175

(22) Filed: Apr. 23, 2014

(51) Int. Cl.
| | | |
|---|---|---|
| *G02F 1/035* | (2006.01) | |
| *G02F 1/025* | (2006.01) | |
| *G02F 1/017* | (2006.01) | |
| *G02F 1/015* | (2006.01) | |
| *G02F 1/01* | (2006.01) | |
| *G02F 1/225* | (2006.01) | |
| *G02B 6/293* | (2006.01) | |
| *G02B 6/26* | (2006.01) | |

(52) U.S. Cl.
CPC .......... *G02F 1/025* (2013.01); *G02F 1/01708* (2013.01); *G02B 6/26* (2013.01); *G02B 6/29335* (2013.01); *G02B 6/29338* (2013.01); *G02B 6/29341* (2013.01); *G02F 1/011* (2013.01); *G02F 1/0147* (2013.01); *G02F 1/2257* (2013.01); *G02F 2001/0151* (2013.01); *G02F 2203/055* (2013.01); *G02F 2203/15* (2013.01); *G02F 2203/585* (2013.01)

(58) Field of Classification Search
CPC .. G02B 6/26; G02B 6/29335; G02B 6/29338; G02B 6/29341; G02F 1/011; G02F 1/0147; G02F 1/025; G02F 1/2257; G02F 2203/055; G02F 2203/15; G02F 2203/585
USPC ............... 385/1–3, 14–15, 31–32, 40, 48–50
See application file for complete search history.

(56) References Cited

U.S. PATENT DOCUMENTS

| | | | | |
|---|---|---|---|---|
| 5,783,805 A | * | 7/1998 | Katzmann | ............. G01R 19/03 136/225 |
| 6,636,668 B1 | * | 10/2003 | Al-hemyari | ........ G02B 6/12007 385/16 |
| 7,113,525 B2 | * | 9/2006 | Andersen | ............. H01S 5/0687 372/20 |
| 7,230,963 B2 | * | 6/2007 | Menon | .................... H01S 5/026 356/478 |

(Continued)

OTHER PUBLICATIONS

"Ultralow-power silicon photonic interconnect for high-performance computing systems" by Li et al., Proc. of SPIE vol. 7607, 760703 • © SPIE.*

(Continued)

*Primary Examiner* — Ryan Lepisto
*Assistant Examiner* — Guy Anderson
(74) *Attorney, Agent, or Firm* — Martin F. Finston

(57) ABSTRACT

A resonant photonic device is provided. The device comprises an optical waveguiding element, such as an optical resonator, that includes a diode junction region, two signal terminals configured to apply a bias voltage across the junction region, and a heater laterally separated from the optical waveguiding element. A semiconductor electrical barrier element is juxtaposed to the heater. A metallic strip is electrically and thermally connected at one end to a signal terminal of the optical waveguiding element and thermally connected at another end to the barrier element.

13 Claims, 1 Drawing Sheet

(56) References Cited

U.S. PATENT DOCUMENTS

| | | | | |
|---|---|---|---|---|
| 7,616,850 | B1* | 11/2009 | Watts | G02B 6/29335 385/2 |
| 7,983,517 | B1* | 7/2011 | Watts | G02B 6/29335 385/32 |
| 8,824,036 | B2* | 9/2014 | Manipatruni | G02F 1/011 359/239 |
| 9,081,215 | B1* | 7/2015 | Zortman | G02F 1/025 |
| 2005/0074209 | A1* | 4/2005 | Baumann | G02B 6/12007 385/50 |
| 2006/0013273 | A1* | 1/2006 | Menon | H01S 5/026 372/32 |
| 2010/0034223 | A1* | 2/2010 | Osinski | H01S 5/026 372/18 |
| 2011/0235962 | A1* | 9/2011 | Shubin | G02B 6/12007 385/14 |
| 2012/0062974 | A1* | 3/2012 | Manipatruni | G02F 1/011 359/238 |
| 2013/0130254 | A1* | 5/2013 | Scherer | A61B 5/1459 435/6.11 |
| 2014/0110572 | A1* | 4/2014 | Li | G01J 1/0209 250/227.23 |

OTHER PUBLICATIONS

Ultralow-power silicon photonic interconnect for high-performance computing systems by Feng et al.*

25Gb/s 1V-driving CMOS ring modulator with integrated thermal tuning by Zheng et al.*

Cascaded silicon-on-insulator double-ring sensors operating in high-sensitivity transverse-magnetic mode by Jiang et al.*

Low Power Thermal Tuning of Second-order Microring Resonators by R. Amatya, C.W. Holzwarth, M. A. Popović, F. Gan, H.I. Smith, F. Kärtner, R.J. Ram.*

Precision Tunable Silicon Compatible Microring Filters by Reja Amatya, Student Member, IEEE, Charles W. Holzwarth, Henry I. Smith.*

Reconfigurable silicon thermo-optical ring resonator switch based on Vernier effect control by Fegadolli et al.*

Thermally tunable silicon racetrack resonators with ultralow tuning power by Dong et al.*

Wide temperature range operation of micrometerscale silicon electro-optic modulators by Manipatruni et al.*

Cunningham, J.E., et al., "Highly-efficient thermally-tuned resonant optical filters", Opt. Expr. 18, pp. 19055-19063 (2010).

Li, G., et al., "25 Gb/s 1 V-driving CMOS ring modulator with integrated thermal tuning", Opt. Expr. pp. 20435-20443 (2011).

Padmaraju, K., et al., "Integrated thermal stabilization of microring modulator", Opt. Expr. vol. 12, Issue 12, pp. 14342-14350 (2013).

Timurdogan, E., et al., "A one femtojoule athermal silicon modulator", arXiv: 1312.2683 pp. 1-23 (2014).

Watts, M.R., et al., "Ultralow Power Silicon Microdisk Modulators and Switches", Proc. $5^{th}$ IEEE International Conference on Group IV Photonics, Cardiff, Sep. 17-19, 2008, IEEE (2008).

Watts, M.R., et al., "Vertical junction silicon microdisk modulators and switches", Opt. Expr. 19, pp. 21989-22003, (Oct. 24, 2011).

Zortman, W.A., et al., "Bit Error monitoring for active wavelength control of silicon microphotonic resonant modulators", IEEE Micro (2013).

Zortman, W.A., et al., "Integrated CMOS Compatible Low Power 10 gbps Silicon Photonic Heater Modulator", (OFC/NFOEC) pp. 1-3 (2012).

Zortman, W.A., et al., "Low-Power High-Speed Silicon Microdisk Modulators", Proc. Lasers and Electro-Optics (CLEO) and Quantum Electronics and Laser Science Conference (QELS), San Jose, CA, pp. 16-21 May 2010, IEEE (2010).

Zortman, W.A., et al., "Low-voltage differentially-signaled modulators," Opt. Expr. vol. 19, Issue 27, pp. 26017-26026 (2011).

* cited by examiner

RESONANT OPTICAL DEVICE WITH A MICROHEATER

STATEMENT REGARDING FEDERALLY SPONSORED RESEARCH

This invention was developed under Contract DE-AC04-94AL85000 between Sandia Corporation and the U.S. Department of Energy. The U.S. Government has certain rights in this invention.

FIELD OF THE INVENTION

The present invention relates to the field of silicon photonics, and more particularly to filters, modulators, and other silicon photonic devices in which frequency selectivity is provided by a microring or microdisk resonator or other waveguiding element.

ART BACKGROUND

The optical behavior of silicon photonic modulators and related devices can be controlled using the change in refractive index produced as a result of a change in electronic carrier concentration. A device offering control of that kind will typically include an optical waveguide in which doped regions, such as p-type and n-type regions, are disposed so as to form a diode. A bias voltage applied across the diode can be varied so as to vary the carrier concentration in the diode junction region, thereby causing the refractive index to change.

The above-described effect can be utilized in various ways. For example, a change in optical path length due to the index change can modulate the output from an interferometer by shifting the relative phase between two interferometer arms between 0 and 180°.

However, the index-shifting effect is relatively weak. In practical applications that are meant to work at low power, it is therefore advantageous to enhance the effect through optical resonance. That is, the shifting of an optical cavity into and out of resonance with an optical field can cause very large changes in the interaction of the cavity with the field. Small changes in the optical path length within the cavity, brought about by changing the bias voltage, may be sufficient to shift a particular wavelength from a condition of being on-resonance to a condition of being off-resonance or vice versa. This may, for example, cause relatively large changes in the optical transmission of a bus waveguide coupled to the cavity.

Optical cavities, exemplarily in the form of microring and microdisk resonators, have been made and have been usefully employed in the manner described above. However, the resonant wavelengths of these and similar devices are very sensitive to temperature and manufacturing variations. It was therefore recognized that for such devices to be generally useful, means should be provided to tune individual devices to the desired operating wavelength.

In one approach to wavelength tuning, a metal strip heater is added directly above the resonator and electrically isolated from the resonator by a layer of silicon oxide. Such an approach is relatively inefficient, however, because the oxide layer is typically a poor thermal conductor.

Greater electrothermal efficiency can be achieved by integrating a microheater in the resonator structure. Such an approach also has potential drawbacks, however, because the integrated heater introduces parasitic current paths that can interfere with the operation of the device. This problem is especially severe in differentially driven modulators, in which a pair of complementary driving voltage signals are applied to the respective modulator contacts. If an integrated heater is present, charge will also flow out of the heater into one of the modulator contacts, and vice versa. The consequent extra charge in the resonator can shift the resonant wavelength in a direction opposite to the shift brought about by heating. Such partial cancellation of the thermo-optical effect reduces the efficiency of the heater.

Another reason why an integral heater may be disfavored is that it adds to the overall size of the device, which may be disadvantageous in applications subject to severe spatial constraints.

Accordingly, there remains a need for new approaches that achieve greater heater efficiency, particularly in compact configurations.

SUMMARY OF THE INVENTION

We have developed a thermally tunable resonant semiconductor photonic device in which an external heater is thermally coupled to the resonator. The device uses a thermal path through a semiconductor electrical barrier and through a metallic line to conduct heat from the heater to the modulator. In specific embodiments, the resonator is a microring or microdisk resonator and the photonic device is an optical modulator. In specific embodiments, the semiconductor is silicon.

More generally, the photonic device is a modulator, filter, switch, or the like, in which the thermal path conducts heat from the heater to a waveguiding optical element. Although specific instances of such a waveguiding optical element are microring or microdisk resonators as mentioned above, the waveguiding element in other useful implementations is a non-resonant element. In particular, a multiple quantum well (MQW) modulator, such as a silicon-germanium (SiGe) MQW, may employ a non-resonant optical waveguiding element.

The semiconductor electrical barrier is a layer of undoped or lightly doped semiconductor, interposed between the heater and an electrical terminal of the resonator or other optical waveguiding element. The barrier offers a poor electrical conduction path while still providing good thermal conduction.

The metallic line is used for the portion of the thermal path terminating on the electrical terminal of the, e.g., resonator because if the semiconductor were connected directly to the resonator, it would couple to the optical mode within the resonator. As a consequence, the optical mode could scatter, which would degrade the quality factor of the resonator.

On the other hand, a metallic connection from the heater directly to the, e.g., resonator terminal would provide a path of low electrical impedance that would greatly increase the power dissipation. By contrast, the composite path described here and below offers both relatively high thermal conductivity and relatively low electrical conductivity without substantially perturbing the optical mode in the resonator.

Accordingly, the invention in one embodiment is a photonic device comprising an optical waveguiding element that includes a diode junction region, two signal terminals configured to apply a bias voltage across the junction region, and a heater laterally separated from the waveguiding element. The embodiment further comprises a semiconductor electrical barrier element juxtaposed to the heater and a metallic line electrically and thermally connected at one end to a signal terminal and thermally connected at another end to the barrier element.

In embodiments, the optical waveguiding element is an optical resonator.

In embodiments, the optical waveguiding element and the heater are defined in silicon on a silicon or SOI substrate.

In embodiments, the heater has two electrical terminals that are both distinct from the signal terminals of the optical waveguiding element.

In embodiments, the electrical barrier element comprises substantially undoped semiconductor.

In embodiments, the photonic device is an optical modulator.

In embodiments, the photonic device is an optical filter.

In embodiments, the photonic device comprises two heaters, one of which is associated with each side of the diode junction region.

In embodiments, the photonic device is a resonant or non-resonant silicon-germanium (SiGe) multiple quantum well (MQW) modulator.

DETAILED DESCRIPTION

In an exemplary embodiment, the photonic device is a resonant optical modulator implemented on a silicon or SOI wafer and including a silicon microdisk or microring resonator. One such resonator, useful in the present context, is the microdisk resonator described in the context of an optical modulator in William A. Zortman, Anthony L. Lentine, Douglas C. Trotter, and Michael R. Watts, "Low-voltage differentially-signaled modulators," *Opt. Express* 19, 26017-26026 (2011) http://www.opticsinfobase.org/oe/abstract.cfm?URI=oe-19-27-26017, hereinafter "Zortman 2011", the entirety of which is hereby incorporated herein by reference.

Figure 1:
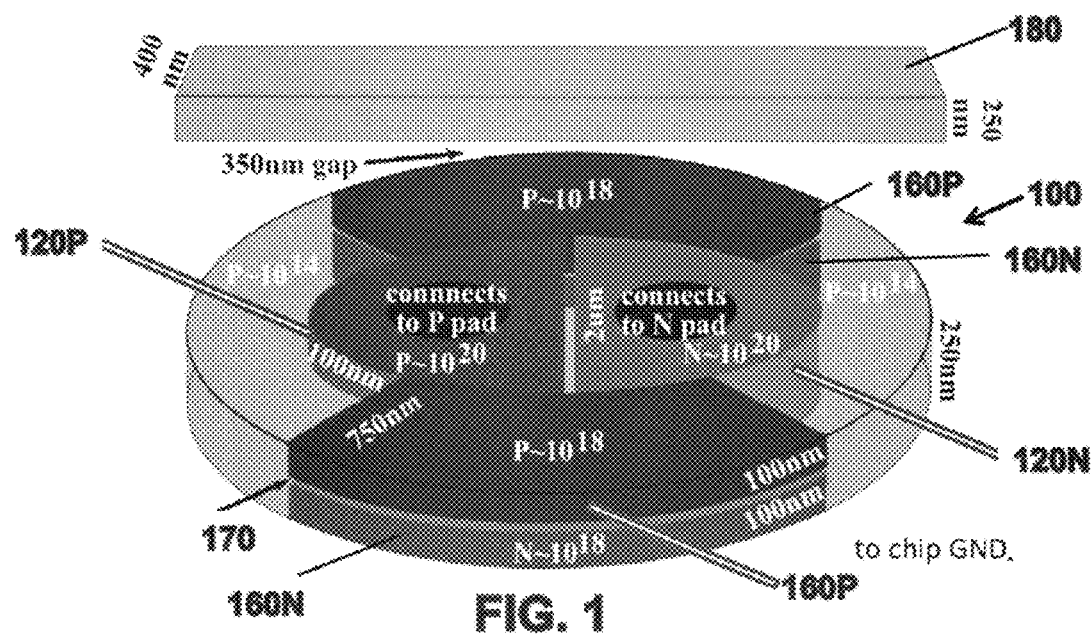
FIG. 1 is a perspective view of a silicon microdisk resonator of the prior art that is useful for the practice of the present invention in some embodiments.

FIG. 1 provides a view of the device described in Zortman 2011. Very briefly, the device is a 3.5-µm-diameter disk 100 built in 250-nm thick silicon on 3 µm of buried oxide (not shown) and then overclad with 5 µm of deposited oxide (not shown). The ohmic contact regions 120P, 120N are doped to $10^{20}$ cm$^{-3}$ and electrically contacted using tantalum-lined tungsten contacts (not shown in FIG. 1). The P-type ohmic contact 120P is about 100 nm thick and the N-type ohmic contact 120N is the full thickness of the silicon. Both ohmic regions are 2 µm wide.

The diode region 160P, 160N is built over π radians of the device, i.e. over two 90° sectors, using a single mask layer with N and P dopants implanted using different energies to create a vertical depletion region 170 between upper P-type region 160P and lower N-type region 160N, both approximately 100 nm thick and doped to a concentration of $10^{18}$ cm$^{-3}$. The dopant implant was limited to a total area of only π radians to minimize the current path in order to increase the modulation speed.

Bus waveguide 180 as described in Zortman 2011 is 250 nm thick and 400 nm wide. Its optical mode is horizontally coupled to the resonator disk across a 350-nm gap.

The modulator is designed to be differentially driven using a principal signal S and a complementary signal S̄ that are 180° out of phase with each other. For example, S may be connected to the anode, i.e., to P-type contact 120P, and S̄ may be connected to the cathode, i.e. to N-type contact 120N.

Although optional in the operation of this and similar devices, differential driving schemes are advantageous for circuit design, particularly when supply voltage levels are limited, because the application of phase-matched complementary driving signals to the respective device terminals effectively doubles the differential swing on each signal line and consequently permits the voltage on each line to be halved.

Figure 2:
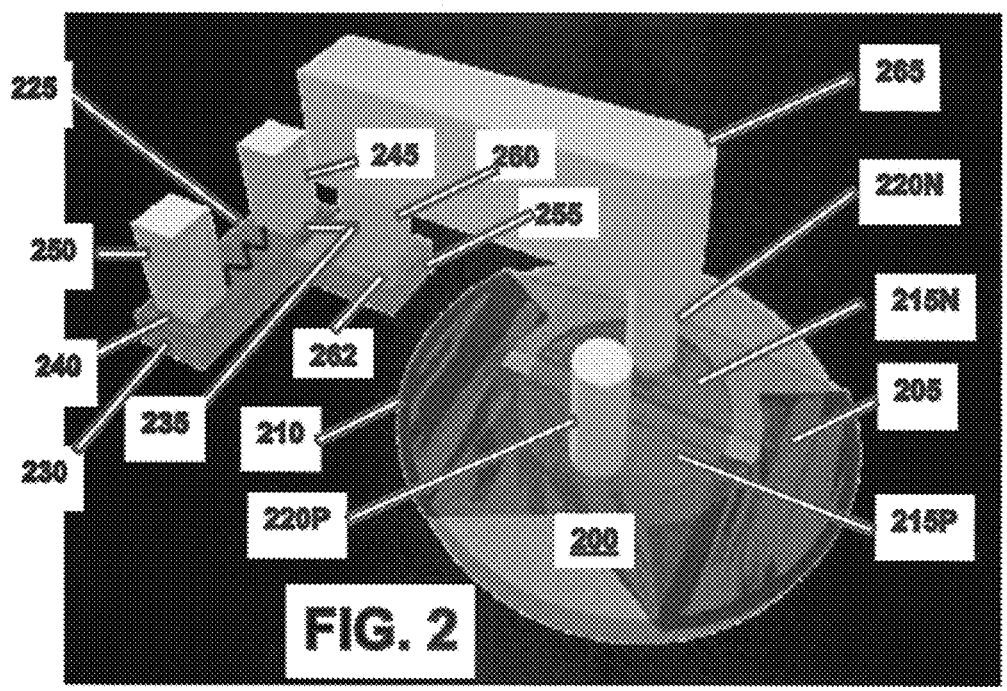
FIG. 2 is a perspective view of an exemplary embodiment of the present invention, in which the resonator is a silicon microdisk resonator similar to the resonator of FIG. 1.

FIG. 2 provides a view of an exemplary embodiment of the present invention in which the resonator is a silicon microdisk resonator similar to the resonator of FIG. 1. As seen in the figure, resonator 200 includes vertical junction sectors 205 and 210, anode 215P, and cathode 215N. A pair of vertically extending studs 220P, 220N are provided to make electrical contact with the anode and cathode, respectively. As will be seen, stud 220N also makes thermal contact with the resonator through cathode 215N. In one example, the studs are tungsten vias created in an exemplary fabrication process by metal deposition in a patterned oxide layer, not shown in the figure, that overlies the resonator disk. A silicon bus waveguide such as waveguide 180 of FIG. 1 is coupled to the resonator by evanescent optical coupling. The the waveguide contains and guides the optical beam that is to be modulated, or in other implementations to be filtered, before, during, and after its interaction with the resonator.

In other implementations, a pair of similar waveguides may be provided and placed at, e.g., opposite sides of the resonator so as to form a device with two output ports. In such an implementation, the output from the second waveguide can provide a complementary output to the first waveguide. When operated as a four-port device, i.e. a device having both two inputs and two outputs, such an implementation can provide a 2-input, 2-output switch that routes light from each input on e.g. a straight path if it is off-resonance or on a crossed path if it is on-resonance. In other respects, the operation of the device is as described above.

Also seen in the figure is heater 225, which in the present example is an n+ doped layer of silicon, typically 1-2 µm long and 200-250 nm thick, overlying a layer 230 of intrinsic silicon and separated from the resonator disk by a distance of, e.g., 1 µm. In an example, the heater layer is made by doping the intrinsic silicon, but it could alternatively be formed through deposition of an overlying layer. Doping is readily provided, e.g., by ion implantation.

The offset distance between the heater and the resonator disk should generally be made as small as practicable, because numerical simulations show that the heating efficiency drops sharply as the offset is increased. We attribute that effect, at least in part, to a contribution to the overall heating of the resonator by thermal conduction through the silicon substrate. The heater is provided with two N-type heavily doped ohmic contact regions 235, 240, each of which is provided a respective stud 245, 250 for making electrical contact to a source of heating current. In the present example, studs 245 and 250 are similar to the resonator studs 220P and 220N.

Those skilled in the art will recognize that viable alternatives to an ohmic heater include a forward-biased diode junction heater.

With further reference to the figure, it will be seen that heater 225, which in the present example has a rectangular conformation, is part of a larger structure having an L-shaped conformation. The larger structure includes barrier element 255, which is exemplarily of intrinsic silicon and abuts and is continuous with heater 225 and the underlying intrinsic silicon layer 230 so as to form the foot of the L shape. It should be noted in this regard that the heater need not be rectangular. It could, for example, be given an arcuate shape in order to maintain more constant separation from the resonator for its entire length.

The function of the barrier element is to suppress the flow of current, while maintaining thermal contact, between the heater and the resonator. Those skilled in the art will recognize that one way to achieve the desired properties is to fabricate the barrier element in silicon that is intrinsic or nearly intrinsic, as in the present example, or so lightly doped as to function effectively as an insulator in the present context. Various other techniques for achieving the desired properties, such as specialized doping techniques, may also be feasible and are not excluded.

The barrier element is provided a vertical stud 260, similar to the studs already described, for contact with metallic tether 265, which will be described below. In the present example, stud 260 is formed on an n+ doped contact region 262 similar to heater contact regions 235 and 240 for consistency with known fabrication techniques, although ohmic contact to the barrier element is not critical, as long as there is a good thermal contact.

Tether 265 is a thermally conductive strip, typically 1 µm in width, 1 µm in height, and by way of example slightly more than 1 µm in length, depending on the distance from the barrier contact and the resonator contact. At one end the tether is connected through the barrier element and its stud to the heater, and at the other end it is connected through stud 220N to the resonator. In the present example, the tether is fabricated as an aluminum film. However, those skilled in the art will recognize that various alternative tether materials, such as other metals, graphene, or polysilicon, may also be feasible.

What is desirable is to provide enough thermal conductance for the direct path through the tether to provide a measurable improvement in the heating efficiency, relative to comparable devices limited to the more diffuse path through the substrate. However, the thermal conductivity of the tether material is preferably great enough to provide such conductance within a cross section small enough to have an insubstantial effect on the high-frequency response of the signal applied to the modulator. Any metal, as well as any material that provides a thermal conductivity sufficient to meet the above said criteria is here termed a "metallic" material.

It will be understood that the microring resonator described above is meant to be exemplary and not limiting. Our device design is inherently flexible in the sense that any microdisk or microring resonator structure can be substituted, with an effect on heating efficiency that is limited to a change in the thermal mass of the heated structure.

Still further, it should be understood that the principles described here are also applicable to at least certain types of non-resonant photonic devices. For example, it is known that silicon-germanium (SiGe) multiple quantum well (MQW) modulators have a temperature-dependent absorption characteristic. Whether in a resonant or a non-resonant implementation, the absorption characteristic of such a device might advantageously be stabilized through the use of a heater and tether arrangement substantially as described here. Accordingly, the microring or microdisk resonator is just one example of a waveguiding element that may be used in the context of the present invention.

It should also be understood that in alternate embodiments, a dual heating arrangement can be provided. In such an arrangement, a second heater is added. The second heater is tethered to the anode in a manner similar to the manner in which the above-described heater is tethered to the cathode. In examples, the heater tethered to the anode will comprise a resistive layer of p-type material, and the heater tethered to the cathode will comprise a resistive layer of n-type material. However, such an arrangement is not critical, because the presence of the intrinsic layer will typically permit only weak diodes to form if the p-type and n-type heater layers in the preceding description are interchanged.

As noted above, the heater is provided with two studs for making electrical contact, and the resonator is likewise provided with two studs for making electrical contact. It will be understood from the above description that in the exemplary device as described, a direct conductive path to the anode passes through the tether and the corresponding resonator stud. Hence, any point on the tether can be used as a contact for connecting to the anode, provided only that the tether has sufficient electrical conductivity.

It will be understood that the device as described above has four electrical terminals, i.e. two for the heating current and two for the bias voltage. For some applications, it might be convenient to tie one modulator terminal and one heater terminal to a common ground, to effectively make a three-terminal device. However, if the device is to be differentially driven, it is preferable to operate with four electrically distinct terminals. For making a three-terminal device, it is preferable to ground the p-terminal of the modulator and to tie the heater on that side, as such an arrangement facilitates driving the modulator in reverse bias as is generally preferred.

The choice of an optical modulator for the embodiment described above is meant to be exemplary only and not limiting. As noted above, similar principles may be applied to an optical switch. Still further devices similarly employing the principles described here include, e.g., optical filters. As is well known to those skilled in the art, an optical filter can be assembled using a single resonator or a plurality of cascaded resonators. The use of bias voltage to switch and to tune such resonators, and the use of heating to tune such resonators is well known.

The embodiment described above is fabricated in silicon on an SOI wafer. Alternate embodiments may be implemented in other semiconductor materials. For example, a heater similar to that described above may be tethered, for similar purpose, to a silicon-germanium (SiGe) multiple quantum well (MQW) modulator such as has been referred to earlier.

A known technique for improving the thermal tuning efficiency of photonic devices involves the co-integration of a back-side etch pit for increasing the thermal impedance of the device. Such a technique is described, e.g., in John E. Cunningham et al., "Highly-efficient thermally-tuned resonant optical filters," *Opt. Express* 18, 19055-19063 (2010). In Cunningham et al., a portion of an SOI handler substrate was removed beneath the footprint of a ring waveguide device by a bulk silicon micromachining process based on wet selective chemical etch. The application of this and similar techniques is optional in the context of the present invention. However, we believe that the combined use of the novel tether structure described here with thermal isolation techniques such as Cunningham et al. has described may lead to still greater thermal efficiencies.

EXAMPLE

Fabrication

A device substantially as described above was fabricated using standard CMOS processing techniques, including the following steps:

1. The resonator disk, the silicon heater strip, the silicon bus waveguide, and the silicon barrier element were lithographically defined in a 250-nm thick layer of silicon overlying 3 µm of buried oxide on an SOI wafer. The resonator disk was 4 µm in diameter. The bus waveguide was 400 nm wide, narrowing to 350 nm wide in the vicinity of the disk, and it was separated from the resonator disk by a 350-nm gap. The heater was 1.5 µm long and 0.8 µm wide as defined by the centers of the contacts. The barrier element was defined as a rectangle extending 0.8 µm parallel to the long axis of the heater and extending 0.65 µm perpendicular to the long axis of the heater, defined in the present example by the edge of the metallic contact to the barrier and by the edge of the heater (i. e. by that portion that was insulating).

2. The diode region was implanted using a single mask layer each, with respectively N-type and P-type dopants. Different implant energies were used for the respective implants so as to create two layers, both approximately 100 nm thick and doped to a concentration of $10^{18}$ cm$^{-3}$, separated by a vertical depletion region.

3. The modulator P-type (i.e. anodic) and N-type (i.e. cathodic) contact regions were doped by ion implantation to $10^{20}$ cm$^{-3}$ in respective layers 100 nm thick (for the anode) and 250 nm thick (the cathode).

4. The two heater contact regions and the barrier element contact region were doped by ion implantation to $10^{20}$ cm$^{-3}$. All dopants were annealed using techniques well known in the art.

5. Several steps of oxide were deposited over the wafer and chemically mechanically polished (CMP) to a height of about 1.2 µm above the silicon surface. The multiple steps are advantageous because they enable integration of germanium and nitride structures, external to the present device, that are co-integrated with the silicon modulators.

6. Vias were etched in the oxide layer for the two heater contacts, the two resonator contacts, and the barrier element contact.

7. The via connections were made by performing a silicide formation, a tungsten fill, and a CMP planarization.

8. The tether and metallic connections to the device were formed by aluminum deposition.

9. A final oxide overlayer of approximately 2.5 µm was deposited.

Results

Devices were fabricated as described above and tested. We measured the resonant frequency shift as a function of electrical power dissipation. Applying heater power of 5.3 mW produced a 250-GHz shift in the resonant frequency, centered near 1549 nm. The measured efficiency was 21.3 µW/GHz. A cool-down time constant (10%-90%) of the device was measured to be 85 µs. A measurement of bit error rate (BER) as a function of received optical power was made, using a $2^7$-1 pseudorandom bit sequence at 10 Gbps to characterize the performance of the modulator with the heater in the off and on states. In the on state, the heater ran at 5.3 mW of applied power, which provided an average temperature increase of 25° C. We found that with the heater on, the power penalty was less than the experimental resolution at a BER of $10^{-9}$.

What is claimed:

1. A photonic device, comprising:
   an optical waveguiding element comprising a diode junction region and two signal terminals configured to apply a bias voltage across the junction region;
   at least one heater laterally separated from the optical waveguiding element;
   an electrically discontinuous, thermally conductive path between the heater and the optical waveguiding element; and
   a dielectric layer that overlies the optical waveguiding element and the heater, wherein
   the thermally conductive path comprises a metallic film that overlies the dielectric layer and is thermally connected to the optical waveguiding element and to the heater by vertical metal connective elements.

2. The photonic device of claim 1, wherein:
   the thermally conductive path includes a semiconductor electrical barrier element juxtaposed to the heater; and
   the metallic film is electrically and thermally connected at one end to a waveguiding element terminal and thermally connected at another end to the barrier element.

3. The photonic device of claim 2, wherein:
   the optical waveguiding element is an optical resonator; and
   the metallic film is electrically and thermally connected at one end to a resonator terminal and thermally connected at another end to the barrier element.

4. The photonic device of claim 3, wherein the optical resonator and the heater are defined in silicon on a silicon or SOI substrate.

5. The photonic device of claim 2, wherein the heater has two electrical terminals that are both distinct from the signal terminals.

6. The photonic device of claim 2, wherein the electrical barrier element comprises substantially undoped semiconductor.

7. The photonic device of claim 2, wherein the photonic device is an optical modulator.

8. The photonic device of claim 2, wherein the photonic device is an optical filter.

9. The photonic device of claim 2, wherein the photonic device is an optical switch.

10. The photonic device of claim 2, wherein the photonic device is a silicon-germanium (SiGe) multiple quantum well (MQW) modulator.

11. The photonic device of claim 2, wherein:
    the device comprises two heaters laterally separated from the waveguiding element;
    one of said heaters is associated with a p-type side of the diode junction region; and
    one of said heaters is associated with an n-type side of the diode junction region.

12. The photonic device of claim 1, wherein the optical waveguiding element is an optical resonator.

13. The photonic device of claim 1, wherein the optical waveguiding element is a silicon-germanium (SiGe) multiple quantum well (MQW) modulator.

* * * * *